United States Patent Office 2,943,255
Patented June 28, 1960

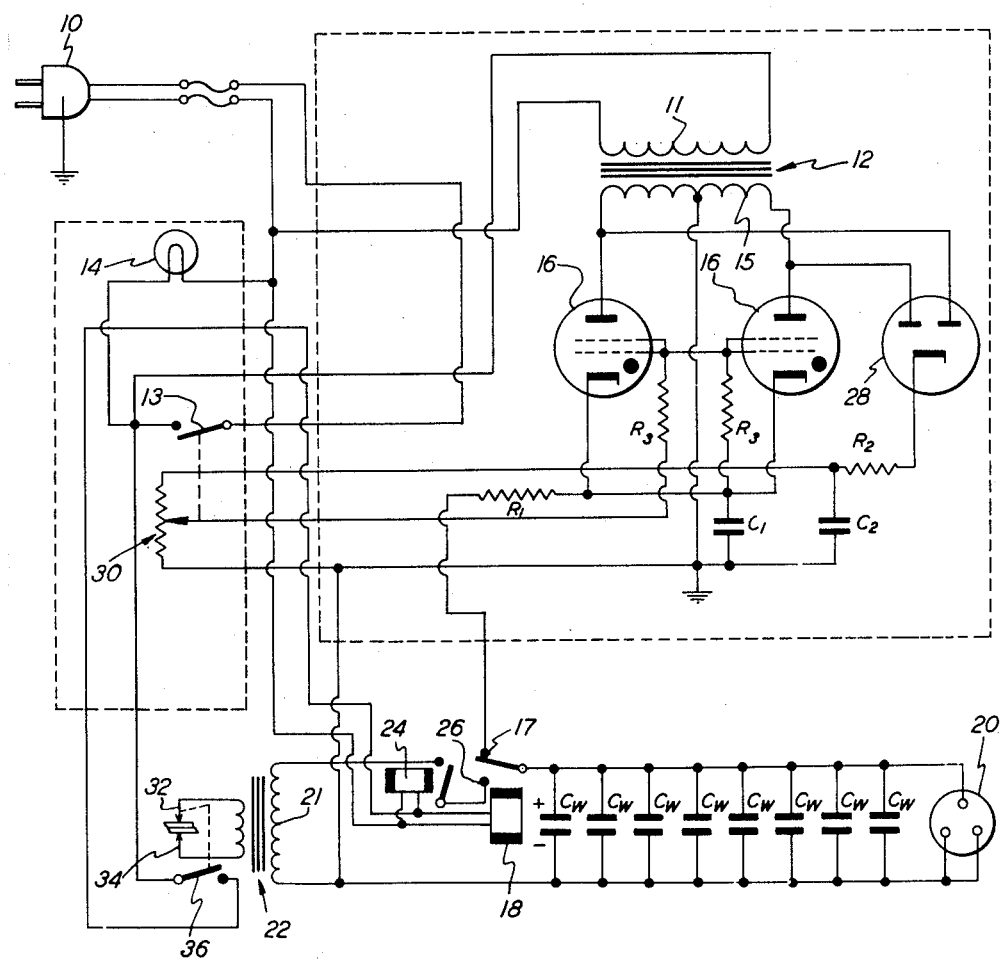

2,943,255

CHARGING CIRCUIT

Armand F. Du Fresne and Franklin H. Page, Jr., Arcadia, Calif., assignors to Du Pa Co., Inc., Arcadia, Calif., a corporation of California Original application July 26, 1954, Ser. No. 445,876, now Patent No. 2,872,564, dated Feb. 3, 1959. Divided and this application Dec. 6, 1956, Ser. No. 626,750

9 Claims. (Cl. 320—1)

This invention is a division of our co-pending application Serial Number 445,876, filed July 26, 1954, and relates to an electrical charging circuit, which is particularly adapted for use in welding apparatus.

In various types of electrical operations, for example, spot welding, it is necessary to pass a surge of electrical current through a load at periodic intervals. In spot welding, the surge of current must be accurately reproduced to obtain uniform welds. Moreover, the circuit which produces the surge of current must be capable of prolonged intermittent operation without failure or requiring replacement of components.

This invention provides a comparatively inexpensive, yet reliable, circuit for passing a uniform surge of current through a load for an almost indefinite number of operations.

Briefly, the circuit includes a capacitor for storing an electrical charge, and a first relay connected to one side of the capacitor. A second relay having a longer actuation time than the first relay is connected in series with the first relay, the load, and the other side of the capacitor. Means are provided for energizing the relays substantially simultaneously so that the first relay is actuated before the second relay.

In the preferred form, the capacitor is charged to a predetermined, but adjustable, voltage by an electrical circuit comprising an electron tube adapted to be connected to a power source and having a plate, a cathode, and a control grid. The plate and the cathode are adapted to be connected in series with an impedance device and the capacitor through one contact of the first, or fast-acting, relay. Means are provided for applying a fixed but adjustable reference voltage to the control grid to establish the voltage to which the power source will charge the capacitor. The first, or fast-acting relay, has another contact which connects the capacitor in series with the load and other relay, so that the relays can be actuated to connect either the load or the charging source across the capacitor.

These and other aspects of the invention will be more clearly understood from the following description taken in conjunction with the accompanying drawing, which is a schematic circuit diagram of the preferred form of the invention.

Referring to the drawing, a conventional three-conductor plug 10 adapted to be connected to a power source (not shown) supplies electrical power to a primary winding 11 of a power supply transformer 12 through a main control switch 13. The main switch also operates a pilot light 14 which indicates when power is supplied to the welding circuit. A secondary winding 15 of the power supply transformer is center-tapped to ground through the ground lead of the plug, and has each of its ends attached respectively to the plates of two thyratron tubes 16. The cathode of each thyratron is connected through a stabilizing capacitor $C_1$ to ground and is also connected through a resistor $R_1$ to a first contact 17 of a relatively quick-acting, double-throw relay 18. The relay armature (normally closed against contact 17) is connected to the positive side of eight welding capacitors $C_w$ connected in parallel. A voltmeter jack 20 is connected across the welding capacitors to permit ready access for checking the voltage stored by the capacitors. The negative side of the capacitors are connected to one end of a primary coil 21 of a welding transformer 22. The other end of the welding transformer primary coil is connected to one contact point of a relatively slow-acting heavy current relay 24, e.g., a mercury plunger-type relay. The slow-acting relay is normally in an open position and its other contact is connected in series with a second contact 26 of the quick-acting relay. The term "quick-acting" and "slow-acting" are used to indicate the relative values of the actuation times of the two relays, i.e., the time required for the relays to open or close after an energizing signal is applied to their coils.

The two plates of a full wave rectifier tube 28 are respectively connected to the opposite ends of the secondary winding of the power transformer. The cathode of the rectifier tube is connected to ground in series with a resistor $R_2$ and a potentiometer 30, the movable arm of which is connected to apply a fixed, but adjustable reference voltage to the control grids of the thyratrons. A smoothing capacitor $C_2$ is connected to ground and a point between resistor $R_2$ and the potentiometer. The rectifier tube is operated at a reduced heater voltage to provide a necessary time delay to protect the thyratron cathode surfaces when the main control switch is turned on. A separate resistor $R_3$ is provided in the grid circuits of each of the thyratrons to protect the grids. For convenience, the various conventional filament power supply components are not shown.

An upper electrode 32 is connected to one end of the secondary winding of the welding transformer, and a lower electrode 34 is connected to the other end of the secondary winding. Movement of the upper electrode is arranged to control a firing switch 36, preferably a microswitch which is in series with the primary winding of the power supply transformer and the relay coils.

The following table gives the values of the resistors and capacitors used in the circuit shown in Fig. 5 where the power supply transformer supplies 750 volts R.M.S., center-tapped, and a maximum of 450 volts D.C. is desired in the welding capacitor:

Capacitors: Mfd.
 $C_1$ ------------------------------------- .25
 $C_2$ ------------------------------------- .01
 $C_w$ ------------------------------------- 100 (each)

Resistances: Ohms
 $R_1$ ------------------------------------- 150
 $R_2$ ------------------------------------- 51K
 $R_3$ ------------------------------------- 470K The circuit operates to store the desired amount of energy in the welding capacitors as follows:

The main control switch is turned on and the circuit is allowed to warm up for about 30 seconds. This switch is ganged with the adjustable arm of the potentiometer so that the main control switch must be turned on before the potentiometer can be adjusted to any desired value. The potentiometer control is then set to the desired value, depending on the type of material to be welded. This imposes a fixed reference voltage with respect to the negative side of the welding capacitors on the grids of the two thyratrons. Since the plates of the thyratrons are connected to an alternating source of power, they are alternately conducting and non-conducting to supply a charge through the cathodes and resistor $R_1$ to the welding capacitors. The welding capacitors become charged to a voltage slightly higher than the reference voltage applied to the thyratron grids. This slight difference in voltage is sufficient to apply a bias voltage between the thyratron grids and cathodes to prevent firing of the thyratrons. If the voltage tends to drop on the capacitors, the voltage difference between the plate-cathode of each thyratron becomes sufficient to overcome the grid bias and the tubes conduct until the capacitor voltage is brought up to the desired value. The resistor $R_1$ in series with the thyratrons and the welding capacitors during the welding operation, stabilizes the charging rate of the capacitors when relatively low voltage is to be stored, e.g., 20 volts, and permits reproducible welding currents of low values to be obtained. The resistance, or other impedance, such as inductance, may be in either the plate or cathode circuit of the thyratrons but better results have been obtained using the latter arrangement.

A weld is made with the apparatus as follows: The upper electrode is moved toward the lower electrode to bear against the work and actuate the firing switch. The mechanism for moving the upper electrode and actuating the firing switch when the electrodes are exerting the proper pressure against the work may be of any suitable type, for example, that described and claimed in our corresponding application Serial Number 445,876, in which the upper arm has low inertia and is urged toward the lower arm by an adjustable spring.

The two coils of the slow and fast-acting relays are energized by the actuation of the microswitch, and the quick-acting relay reacts first to connect the positive side of the welding capacitors to the contact of the slow-acting relay. A short time later the slow-acting relay closes to connect the welding capacitors across the primary coil of the welding transformer, and cause a large but controlled surge of current through the welding transformer secondary, the electrodes, and the work, which becomes molten at the point of electrode contact. Due to the low inertia of the upper arm, and the spring, the upper electrode is immediately pressed down onto the molten metal to give a proper forging action. Preferably the fast-acting relay operates to close in the matter of four or five microseconds and the slower-acting mercury relay operates to close in 10 to 12 microseconds. Thus, the operation of the relays is almost instantaneous; yet the mercury plunger relay, which is capable of conducting large currents without any pitting or welding of relay contacts, actually makes the circuit to conduct the large welding current. In addition, the mercury relay is considerably cheaper than other elements, e.g., thyratron tubes, which are normally used in welding circuits for making contact to conduct the welding current.

After the weld is completed, the upper electrode is raised and the microswitch opens and resets for another operation. On the opening of the microswitch, the two relays fall back into their original positions shown in the drawing and the charging of the welding capacitors proceeds as described above.

We claim:

1. In a circuit for passing a surge of current through a load, the combination comprising a capacitor for storing an electrical charge, a first relay having a normally open contact adapted to be connected to one side of the capacitor when the first relay is actuated, a second relay having a longer actuation time than the first relay, the second relay having a normally open contact adapted to be connected serially with the first relay contact, the load and the other side of the capacitor when the second relay is actuated, and means for energizing the relays substantially simultaneously so that the first relay is actuated before the second relay.

2. In a circuit for passing a surge of current through a load, the combination comprising a capacitor for storing an electrical charge, a first relay having a normally open contact adapted to be connected to one side of the capacitor when the first relay is actuated, a second relay having a longer actuation time than the first relay, the second relay having a normally open contact adapted to be connected serially with the first relay contact, the load and the other side of the capacitor when the second relay is actuated, and means for energizing the relays substantially simultaneously so that the first relay closes before the second relay closes to complete the circuit.

3. A circuit according to claim 2 in which the second relay is of the mercury plunger type.

4. A circuit according to claim 2 in which the second relay is adapted to carry a substantially larger current than the first while completing the circuit.

5. In a circuit for passing a surge of current through a load, the combination comprising a capacitor for storing an electrical charge, means for charging the capacitor, a first relay having a movable arm connected to one side of the capacitor and normally connected to a first contact which is connected to the charging means, a normally open second relay connected serially with a second contact of the first relay, the second relay having a longer actuating time than the first relay and being connected serially through the load to the other side of the capacitor, means for energizing the relays substantially simultaneously so that the movable arm of the first relay moves from the first to the second contact before the second relay closes to complete the circuit.

6. In a circuit for storing a fixed but adjustable electrical charge from an alternating current source, the combination comprising a capacitor, an impedance, an electron tube having a plate, cathode and control grid, the source, capacitor, and impedance being connected in series with the cathode and anode, means for applying only a steady state D.C. reference voltage to the control grid with respect to the negative side of the capacitor independently of the charge on the capacitor and for the full time the capacitor is being charged, and means for adjusting the value of the steady state reference voltage.

7. In a circuit for storing a fixed but adjustable electrical charge from an alternating current source, the combination comprising a capacitor, a resistor, an electron tube having a plate, cathode and control grid, the source, capacitor and resistor being connected in series with the cathode and anode, means for applying only a steady state D.C. reference voltage to the control grid with respect to the negative side of the capacitor independently of the charge on the capacitor and for the full time the capacitor is being charged, and means for adjusting the value of the steady state reference voltage.

8. In a circuit for storing a fixed but adjustable electrical charge from an alternating current source, the combination comprising a capacitor, an impedance, a gas-filled electron tube having a plate, cathode and control grid, the source, capacitor and impedance being connected in series with the cathode and anode, means for applying only a steady state D.C. reference voltage to the control grid with respect to the negative side of the capacitor independently of the charge on the capacitor and for the full time the capacitor is being charged, and means for adjusting the value of the steady state reference voltage.

9. In a circuit for storing a fixed but adjustable electrical charge from an alternating current source, the combination comprising a capacitor, an impedance, a thyratron having a plate, cathode and control grid, the source, capacitor and impedance being connected in series with the cathode and anode, means for applying only a steady state D.C. reference voltage to the control grid with respect to the negative side of the capacitor independently of the charge on the capacitor and for the full time the capacitor is being charged, and means for adjusting the value of the steady state reference voltage.

References Cited in the file of this patent

UNITED STATES PATENTS

| | | |
|---|---|---|
| 2,404,971 | Mahoney et al. | July 30, 1946 |
| 2,441,822 | Klemperer | May 18, 1948 |
| 2,477,946 | Smith | Aug. 2, 1949 |
| 2,483,691 | Dawson | Oct. 4, 1949 |
| 2,551,407 | Alder | May 1, 1951 |
| 2,775,731 | Schalk | Dec. 25, 1956 |

FOREIGN PATENTS

| | | |
|---|---|---|
| 612,242 | Great Britain | Nov. 10, 1948 |